(12) United States Patent
Glaze et al.

(10) Patent No.: US 10,119,223 B2
(45) Date of Patent: Nov. 6, 2018

(54) CARPET AND SYNTHETIC TURF BACKINGS PREPARED FROM A POLYETHER CARBONATE POLYOL

(71) Applicant: Covestro LLC, Pittsburgh, PA (US)

(72) Inventors: Amanda Glaze, Eighty Four, PA (US); Michael S. Robinson, Rocky Face, GA (US); Samuel Torres-Ramos, Moon Township, PA (US)

(73) Assignee: COVESTRO LLC, Pittsburgh, PA (US)

( * ) Notice: Subject to any disclaimer, the term of this patent is extended or adjusted under 35 U.S.C. 154(b) by 159 days.

(21) Appl. No.: 15/211,341

(22) Filed: Jul. 15, 2016

(65) Prior Publication Data

US 2018/0016741 A1    Jan. 18, 2018

(51) Int. Cl.
| | |
|---|---|
| *D06M 15/568* | (2006.01) |
| *E01C 13/08* | (2006.01) |
| *A47G 27/02* | (2006.01) |
| *C08G 18/08* | (2006.01) |
| *C08G 18/24* | (2006.01) |
| *C08G 18/48* | (2006.01) |

(Continued)

(52) U.S. Cl.
CPC ........... *D06M 15/568* (2013.01); *A47G 27/02* (2013.01); *C08G 18/0838* (2013.01); *C08G 18/242* (2013.01); *C08G 18/4812* (2013.01); *C08G 18/7664* (2013.01); *C08K 3/26* (2013.01); *C09D 175/08* (2013.01); *D06N 7/0071* (2013.01); *E01C 13/08* (2013.01); *C08K 2003/265* (2013.01); *D06M 2101/32* (2013.01); *D06N 2203/063* (2013.01); *D06N 2203/068* (2013.01); *D06N 2205/10* (2013.01); *D06N 2205/106* (2013.01); *D06N 2211/066* (2013.01); *D06N 2213/06* (2013.01)

(58) Field of Classification Search
CPC .... E01C 13/08; D06N 7/0063; D06N 7/0071; D06N 7/0086; D06N 2201/0245; D06N 2201/0254; D06N 2201/0263; D06N 2201/0281; D06N 2201/02; D06N 2203/068; D06N 2211/066; D06M 15/568; A47G 27/02; D05C 17/02
See application file for complete search history.

(56) References Cited

U.S. PATENT DOCUMENTS

| | | |
|---|---|---|
| 2,764,565 A | 9/1956 | Hoppe et al. |
| 3,215,652 A | 11/1965 | Kaplan |

(Continued)

FOREIGN PATENT DOCUMENTS

| | | |
|---|---|---|
| DE | 2423984 A1 | 11/1975 |
| DE | 2513815 A1 | 9/1976 |

(Continued)

OTHER PUBLICATIONS

Robinson et al; U.S. Appl. No. 14/713,699; "Free-Flowing Coated Rubber Particles, Methods for Their Production and Use"; Filed May 15, 2015; Covestro LLC, Pittsburgh, PA.

(Continued)

*Primary Examiner* — Cheryl Juska
(74) *Attorney, Agent, or Firm* — Donald R. Palladino

(57) ABSTRACT

Disclosed are tufted carpet structures, including synthetic turf structures, such as synthetic grass structures, that include a polyurethane backing coating formed from a polyether carbonate polyol.

15 Claims, 1 Drawing Sheet

(51) Int. Cl.
*C08G 18/76* (2006.01)
*C08K 3/26* (2006.01)
*C09D 175/08* (2006.01)
*D06N 7/00* (2006.01)
*D06M 101/32* (2006.01)

(56) References Cited

U.S. PATENT DOCUMENTS

| | | | |
|---|---|---|---|
| 3,360,495 | A | 12/1967 | Muller et al. |
| 3,404,109 | A | 10/1968 | Milgrom |
| 3,829,505 | A | 8/1974 | Herold |
| 3,869,413 | A | 3/1975 | Blankenship |
| 3,887,500 | A | 6/1975 | Prokai et al. |
| 3,941,849 | A | 3/1976 | Herold |
| 3,957,842 | A | 5/1976 | Prokai et al. |
| 4,093,569 | A | 6/1978 | Reischl et al. |
| 4,184,990 | A | 1/1980 | Reischl et al. |
| 4,251,401 | A | 2/1981 | Reischl |
| 4,282,135 | A | 8/1981 | Wagner |
| 4,301,262 | A | 11/1981 | Wagner et al. |
| 4,305,858 | A | 12/1981 | Reischl |
| 4,310,449 | A | 1/1982 | Reischl |
| 4,337,283 | A | 6/1982 | Haas, Jr. |
| 4,826,887 | A | 5/1989 | Kuyper et al. |
| 5,158,922 | A | 10/1992 | Hinney et al. |
| 5,470,813 | A | 11/1995 | Le Khac |
| 5,536,883 | A | 7/1996 | Le-Khac |
| 5,637,673 | A | 6/1997 | Le-Khac |
| 5,714,428 | A | 2/1998 | Le-Khac |
| 5,789,626 | A | 8/1998 | Le-Khac |
| 6,018,017 | A | 1/2000 | Le-Khac |
| 6,096,401 | A | 8/2000 | Jenkines |
| 6,191,214 | B1 * | 2/2001 | Cheng ............... C08G 18/0828 524/591 |
| 6,723,412 | B2 | 4/2004 | Prevost |
| 6,767,986 | B2 | 7/2004 | Moethrath et al. |
| 7,008,900 | B1 | 3/2006 | Hofmann et al. |
| 7,026,031 | B2 | 4/2006 | Holeschovsky et al. |
| 7,093,781 | B2 | 8/2006 | Meckert et al. |
| 7,108,207 | B2 | 9/2006 | Waznys et al. |
| 7,445,170 | B2 | 11/2008 | Cialone et al. |
| 7,977,501 | B2 | 7/2011 | Haider et al. |
| 8,134,022 | B2 | 3/2012 | Haider et al. |
| 8,324,419 | B2 | 12/2012 | Mijolovic et al. |
| 8,592,550 | B2 | 11/2013 | Frijns et al. |
| 8,604,155 | B2 | 12/2013 | Allen et al. |
| 8,859,452 | B2 | 10/2014 | Zhang et al. |
| 8,933,192 | B2 | 1/2015 | Guertler et al. |
| 8,946,466 | B2 | 2/2015 | Guertler et al. |
| 9,018,345 | B2 | 4/2015 | Kunst et al. |
| 9,045,592 | B2 | 6/2015 | Guertler et al. |
| 9,096,717 | B2 | 8/2015 | Wamprecht et al. |
| 9,115,246 | B2 | 8/2015 | Kunst et al. |
| 9,249,259 | B2 | 2/2016 | Mueller et al. |
| 9,296,859 | B2 | 3/2016 | Guertler et al. |
| 9,683,334 | B2 * | 6/2017 | Robinson ............ C08G 18/667 |
| 2005/0281977 | A1 | 12/2005 | Mashburn |
| 2007/0009680 | A1 | 1/2007 | Dipple |
| 2008/0021154 | A1 | 1/2008 | Haider et al. |
| 2008/0241458 | A1 | 10/2008 | Jenkines |
| 2009/0306239 | A1 | 12/2009 | Mijolovic et al. |
| 2013/0035408 | A1 * | 2/2013 | Knott ............... C08G 18/7621 521/112 |
| 2013/0078473 | A1 * | 3/2013 | Kollbach ........... C08G 18/4238 428/423.1 |
| 2013/0274401 | A1 * | 10/2013 | Allen .................. C09J 175/04 524/445 |
| 2014/0107245 | A1 | 4/2014 | Hofmann et al. |
| 2014/0256908 | A1 | 9/2014 | Hofmann et al. |
| 2015/0232606 | A1 | 8/2015 | Wamprecht et al. |
| 2015/0259475 | A1 | 9/2015 | Mueller et al. |
| 2015/0284501 | A1 | 10/2015 | Wamprecht et al. |
| 2016/0194441 | A1 * | 7/2016 | Blanco Gonz lez ... C08G 64/34 558/266 |
| 2016/0257776 | A1 * | 9/2016 | Jacobs .................. C08G 18/12 |
| 2016/0264711 | A1 * | 9/2016 | Krebs ............... C08G 18/4837 |
| 2016/0297919 | A1 * | 10/2016 | Klesczewski ...... C08G 18/4866 |
| 2016/0333535 | A1 * | 11/2016 | Robinson .............. C08J 3/124 |
| 2017/0152343 | A1 * | 6/2017 | Gunther ............. C08G 18/4829 |
| 2017/0174817 | A1 * | 6/2017 | Gunther ............. C08G 18/4829 |
| 2018/0044463 | A1 * | 2/2018 | Gunther ............. C08G 18/4829 |
| 2018/0044464 | A1 * | 2/2018 | Klesczewski ...... C08G 18/7621 |
| 2018/0127536 | A1 * | 5/2018 | Lindner ............. C08G 18/4841 |
| 2018/0237577 | A1 * | 8/2018 | Brassat ............. C08G 18/4837 |

FOREIGN PATENT DOCUMENTS

| | | | | |
|---|---|---|---|---|
| DE | 2550833 | A1 | 5/1977 | |
| DE | 2550862 | A1 | 5/1977 | |
| DE | 102004015430 | A1 * | 10/2005 | ......... C08G 18/0823 |
| GB | 1090589 | | 11/1967 | |
| WO | WO-2013158621 | A1 * | 10/2013 | ............ C09J 175/04 |
| WO | 2016001221 | A1 | 1/2016 | |
| WO | WO-2016120406 | A1 * | 8/2016 | ......... C08G 18/4829 |

OTHER PUBLICATIONS

Arcol® Polyol 1108—for flexible slabstock foams; Product Datasheet; Edition Dec. 7, 2009; Leverkusen, Germany.

Desmophen® 95LC05 (Trial Product); Provisional Product Datasheet; Edition Apr. 30, 2015; Leverkusen, Germany.

* cited by examiner

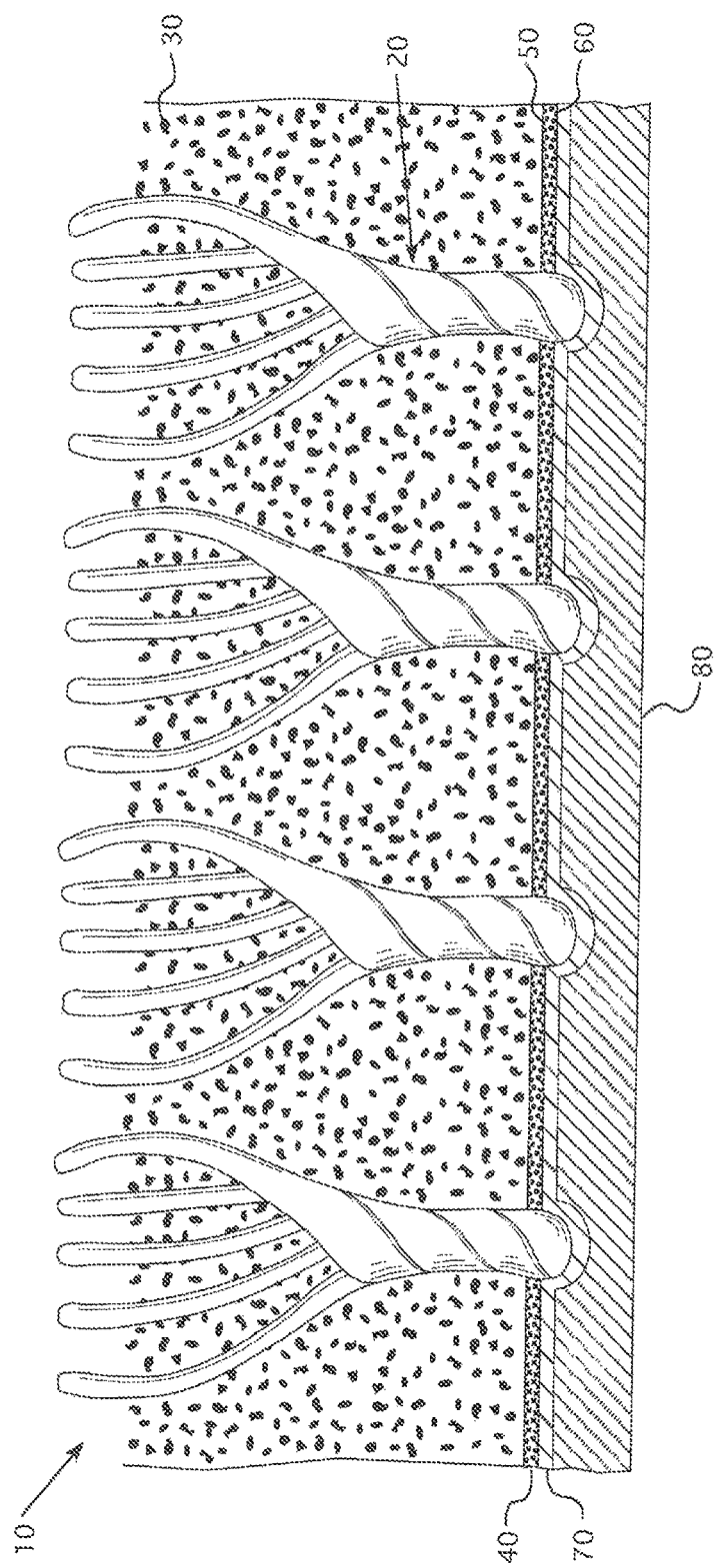

CARPET AND SYNTHETIC TURF BACKINGS PREPARED FROM A POLYETHER CARBONATE POLYOL

FIELD

The present invention is directed to carpets, including synthetic turfs, such as synthetic grasses, that include a polyurethane backing coating formed from a polyether carbonate polyol.

BACKGROUND

Tufted carpet structures, such as synthetic turf, are often employed to reduce labor and other expense associated with the maintenance of natural surfaces, such as natural grass surfaces. Such tufted carpet structures are often used as athletic fields, playground surfaces, safety surfaces, running/walking trail surfaces, landscaping walkway surfaces, and equestrian surfaces.

Tufted carpets, including synthetic turfs, are made by tufting fiber bundles through a primary backing material, which is often a woven fabric. These fiber bundles are then secured to the primary backing by the application of a coating that covers the portion of the fiber bundles tufted into the primary backing. In many cases, the coating includes a polyurethane. The coating is important for locking the fiber bundles to the primary backing, which is a property sometimes known as tuftbind. The polyurethane coating also often provides other important properties to the carpet, such as dimensional stability, moisture resistance, and flame retardency. In addition to the fiber bundles, primary backing, and coating, the carpet may also include other layers, such as a secondary backing and a foam layer.

Tuftbind is an important feature of carpets, especially synthetic turfs, because it reflects the degree to which the tufts are bound, or locked, into the primary backing. As will be appreciated, synthetic turfs in particular can be subject to stresses as a result of physical activity that is taking place on the structure. The extent to which the structure can withstand such stresses, and maintain the tufts bound, i.e., locked, into the primary backing, is an important property for the durability and appearance of the synthetic turf.

As a result, it would be desirable to provide carpets, especially synthetic turfs, that include a polyurethane coating that enables the carpet to have improved tuftbind, while maintaining the other advantages of carpets that employ polyurethane backing coatings.

SUMMARY OF THE INVENTION

In certain respects, the present invention is directed to a carpet, such as a synthetic turf. These carpets comprise: (a) rows of fiber bundles; (b) a primary backing, wherein the rows of fiber bundles are tufted into the primary backing, and (c) a coating deposited over at least a portion of the primary backing and covering the portion of the fiber bundles tufted into the primary backing, wherein the coating comprises a polyurethane that is a reaction product of: (1) a polyisocyanate, and (2) an isocyanate-reactive composition comprising a polyether carbonate polyol having an incorporated carbon dioxide content.

In other respects, the present invention is directed to a synthetic grass surface comprising synthetic grass blades having an end extending away from a backing, wherein the backing has deposited on at least one side thereof a coating comprising a polyurethane that is a reaction product of: (1) a polyisocyanate, and (2) an isocyanate-reactive composition comprising a polyether carbonate polyol having an incorporated carbon dioxide content.

The present invention is also directed to, among other things methods for making and using such carpets, synthetic turf structures and synthetic grass surfaces.

BRIEF DESCRIPTION OF THE DRAWING

FIG. 1 illustrates a carpet according to some embodiments of the invention.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the present invention are directed to carpets, such as synthetic turfs, such as synthetic grasses. An embodiment of the present invention will now be described with reference to FIG. 1. In certain embodiments, such synthetic turfs are embodied as an athletic field, playground surface, safety surface, running/walking trail surface, landscaping walkway surface, or an equestrian surface.

As illustrated, in certain embodiments, the carpet 10, such as synthetic turf, of the present invention comprises rows of fiber bundles 20. The fibers in the fiber bundles 20 are in the form of a strip and can be made of any of a variety of materials, including natural materials, such as cotton and/or wool. In other embodiments, such as in the case of synthetic turf, the fibers in the fiber bundles 20 are made of a synthetic material, such as a nylon, a polyester, a polyurethane, a polyolefin, such as a polyethylene and/or a polypropylene, or a mixture of two or more thereof. The fibers in the fiber bundles 20 could also be constructed of a mixture of any of the foregoing natural and synthetic materials. The fibers of the fiber bundles 20 are tufted into the primary backing 40 and have an end that projects away from the primary backing 40.

The fibers often have a width of ¼ inch to 1 inch (0.32 to 2.54 centimeters), a thickness of 1/16 inch to ½ inch (0.16 to 1.27 centimeters), and/or a length of ¾ inch to 5 inches (1.91 to 12.7 centimeters). The fibers are colored as desired to provide the desired appearance of the carpet. In the case of synthetic turf, for example, green (to replicate natural grass), grey, blue, or black, are colors that are often employed.

In some embodiments, the fibers are split to a thickness of ¼ inch (0.32 centimeter) or more. The spacing of the rows of fiber bundles 20 in the structure can also vary as desired.

For example, in some embodiments, the rows of fiber bundles 20 are spaced ½ inch to 3 inches (1.27 to 7.62 centimeters) apart.

In some embodiments, the distance between the end of the fiber bundles 20 that is projected away from the primary backing 40 and the primary backing 40 is at least twice the spacing between the rows of fiber bundles 20, such as three to six times the spacing between the rows of fiber bundles 20.

As illustrated in FIG. 1, embodiments of the carpets, such as synthetic turfs, of the present invention comprise a primary backing 40 comprising, for example, a woven or non-woven material and having a top 50 and a bottom 60 opposite of the top, wherein the rows of fiber bundles 20 are tufted into the primary backing 40 and an end of the fiber bundles 20 project away from the top 50 of the primary backing 40. In certain embodiments, between 2 to 8 tufts are formed per inch (1 to 3 tufts per centimeter) of row of fiber bundles 20. In some embodiments, primary backing 40 is a single layer of material, such as is depicted in FIG. 1, though, as will be appreciated, it is also possible that the primary backing 40 comprises two or more layers of material. The primary backing 40 can be made of any of a variety of materials, including, but not limited to, natural materials, such as wool, jute or cotton, or a mixture thereof. The primary backing 40 can also be made of a woven or non-woven synthetic material, such as a polyolefin, including a polyethylene and/or polypropylene, a polyester, and/or polyurethane. In some embodiments, the primary backing 40 is a multifilament composite structure with glass fiber and/or polyester woven scrims and a polypropylene fleece. The primary backing 40 can also be made of a mixture of any of the foregoing natural materials and synthetic materials.

In the carpets of the present invention, a coating 70 is deposited over at least a portion of the bottom 60 of the primary backing 40 and covers the portion of the fiber bundles 20 tufted into the primary backing 40, such as is depicted in FIG. 1.

In the carpets, such as synthetic turfs, of the present invention, the coating 70 comprises a polyurethane that is a reaction product of a polyisocyanate and a isocyanate-reactive composition. Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 1,5-pentamethylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates obtained by chemical reaction of diisocyanates and/or polyisocyanates can be used. Modified isocyanates useful in the practice of the present invention include isocyanates containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 25 to 30 weight percent, such as those based on polyether polyols or polyester polyols and diphenylmethane diisocyanate.

In some embodiments, the polyisocyanate includes a modified polymeric diphenylmethane diisocyanate having an average functionality of from 1.8 to 3.5, such as from 2.0 to 3.1, or 2.4 to 2.6, isocyanate moieties per molecule and an NCO content of from 25 to 35 weight percent, such as 25 to 28 weight percent, due to their ability to cross-link the polyurethane.

As indicated, the polyurethane coating is the reaction product of a polyisocyanate and an isocyanate-reactive composition. In the present invention, the isocyanate-reactive composition comprises a polyether carbonate polyol having an incorporated carbon dioxide content. It was surprisingly discovered that, by utilizing an isocyanate-reactive composition comprising a sufficient amount of a polyether carbonate polyol having incorporated carbon dioxide content in the manufacture of the coating 70 in certain carpets, such as synthetic turfs, the tuftbind properties of the carpet, such as synthetic turf, could be substantially improved in at least some cases relative to the use of a similar isocyanate-reactive composition that does not include a polyether carbonate polyol having incorporated carbon dioxide content.

Polyether carbonate polyols suitable for use in the present invention include, for example, those obtained via an addition reaction of carbon dioxide and of alkylene oxides onto H-functional starter substances. For the purposes of the present invention, "H-functional" means a starter compound which has H atoms that are active in relation to alkoxylation.

The production of polyether carbonate polyols via an addition reaction of alkylene oxides and $CO_2$ onto H-functional starters is described, for example, in U.S. Pat. Nos. 4,826,887, 7,977,501, 8,134,022, and 8,324,419.

In certain embodiments of the present invention, the content of carbonate groups, calculated as $CO_2$ in the polyether carbonate polyol, is within the range of 3 to 35% by weight, such as 5 to 30% by weight, 10 to 28% by weight, or, in some cases 10 to 20% by weight or 10 to 15% by weight. The determination method is NMR, using the analysis method specified in United States Patent Application Publication No. 2015/0232606 A1 at [0071]-[0073], the cited portion of which being incorporated herein by reference. In particular, according to such a method, the $CO_2$ content incorporated within the polyether carbonate polyol is determined by means of $^1H$ NMR (Bruker, DPX 400, 400 MHz: pulse program zg30, delay 5 s, 100 scans) in which the sample is dissolved in deuterated chloroform. Internal standard is added to the deuterated solvent comprised dimethyl terephthalate (2 mg for every 2 g of $CDCl_3$). The relevant resonances in the $^1H$ NMR (based on MCl; =7.24 ppm) are as follows: Carbonates, resulting from carbon dioxide incorporated within the polyether carbonate polyol (resonances at from 5.2 to 4.8 ppm), PO not consumed in the reaction with resonance at 2.4 ppm, polyether polyol (i.e. without incorporated carbon dioxide) with resonances at from 1.2 to 1.0 ppm. The molar content of the carbonate incorporated within the polymer, of the polyether polyol fractions, and also of the PO not consumed in the reaction are determined via integration of the corresponding signals.

In some embodiments of the present invention, the number-average molar mass (also referred to herein as $M_n$), of the polyether carbonate polyol is within the range of 500 and 10000 g/mol, such as 500 to 7500 g/mol, 750 to 6000 g/mol, 1000 to 5000 g/mol, or, in some cases, 1500 to 4000 g/mol. The determination method is titration of the terminal OH groups, using the analysis method specified in United States Patent Application Publication No. 2015/0232606 A1 at [0074], the cited portion of which being incorporated herein by reference. In particular, $M_n$ is determined as follows: the OH number is first determined experimentally via esterification followed by back-titration of the excess esterification reagent with standard alcoholic potassium hydroxide solution in accordance with DIN 53240-2. The OH number is stated in mg KOH per gram of polyol. The $M_n$ is calculated from the OH number by way of the equation:

$$M_n = \frac{56100 * f}{OH\#}$$

in which f is the OH functionality of the compound (i.e., the number of hydroxyl groups per molecule), and OH# is the hydroxyl number of the polyol and is equal to the mass in milligrams of potassium hydroxide (56.1 grams/mol) equivalent to the hydroxyl content in one gram of the polyol compound (mg KOH/g). The OH functionality referred to herein is the theoretical average nominal functionality of the polyol, i.e., the functionality calculated based on the average number of hydroxyl groups per molecule of starter used to produce the polyol. On the other hand, in the case of monomeric polyols with a defined structure, the molar mass is calculated from the molecular formula.

In certain embodiments of the present invention, the OH functionality of the polyether carbonate polyol is at least 1, such as 1 to 8, 1 to 6, 2 to 4, 2.5 to 3.5, or, in some cases 2.8 to 3.2.

Production of the polyether carbonate polyols can generally use alkylene oxides (epoxides) having from 2 to 24 carbon atoms, specific examples of which include, but are not necessarily limited to, ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidized fats in the form of mono-, di-, and triglyceride, epoxidized fatty acids, $C_1$-$C_{24}$-esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate, and also epoxy-functional alkoxysilanes, for example 3-glycidyloxypropyltrimethoxysilane, 3-glycidyloxypropyltriethoxysilane, 3-glycidyloxypropyltripropoxysilane, 3-gycidyloxypropylmethyldimethoxysilane, 3-glycidyloxypropylethyldiethoxysilane, and 3-glycidyloxypropyltriisopropoxysilane. Mixtures of two or more of any of the foregoing may be used. In some cases, ethylene oxide and/or propylene oxide is used.

In certain embodiments the proportion of ethylene oxide used is 0 to 90% by weight, such as 0 to 50% by weight, or, in some cases 0 to 25% by weight, based on the total weight of alkylene oxides used. In certain embodiments the proportion of propylene oxide used is 10 to 100% by weight, such as 50 to 100% by weight, or, in some cases 75 to 100% by weight, based on the total weight of alkylene oxides used.

Compounds having H atoms that are active in relation to alkoxylation are used as H-functional starters. Specific examples of such compounds are those having —OH, —NH₂ (primary amines), —NH— (secondary amines), —SH, and/or —CO₂H groups. Specific, but not necessarily limiting, examples of suitable such starters are polyhydric alcohols, polyfunctional amines, polyfunctional thiols, amino alcohols, thin alcohols, hydroxyesters, polyether polyols, polyester polyols, polyester ether polyols, polyether carbonate polyols, polycarbonate polyols, polycarbonates, polyethyleneimines, polyether amines (such as those known as Jeffamine® from Huntsman), polytetrahydrofurans (such as PolyTHF® from BASF, including PolyTHF® 250, 650S, 1000, 1000S, 1400, 1800, 2000), polytetrahydrofuranamincs (BASF product polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and alkyl fatty acid esters having an average of at least two OH groups per molecule. The $C_1$-$C_{24}$ alkyl fatty acid esters having an average of at least two OH groups per molecule are, for example, commercially available products such as Lupranol Balance® (BASF AG), Merginol® grades (Hobum Oleocheinicals GmbH), Sovermol® grades (Cognis Deutschland GmbH & Co. KG), and Soyol®™ grades (USSC Co.).

Specific, but not necessarily limiting, examples of suitable polyhydric alcohols for use as H-functional starter are dihydric alcohols, such as ethylene glycol, diethylene glycol, propylene glycol, dipropylene 1,3-propanediol, 1,4-butanediol, 1,4-butenediol, 1,4-butynediol, neopentyl glycol, 1,5-pentanediol, methylpentanediol (e.g. 3-methyl-1,5-pentanediol), 1,6-hexanediol, 1,8-octanediol, 1,10-decanediol, 1,12-dodecanediol, bis(hydroxymethyl) cyclohexanes (e.g. 1,4-bis(hydroxymethyl)cyclohexane), triethylene glycol, tetraethylene glycol, polyethylene glycol, dipropylene glycol, tripropylene glycol, polypropylene glycol, dibutylene glycol, and polybutylene glycols, and also all of the modification products of these abovementioned alcohols with various quantities of ε-caprolactone. Mixtures of H-functional starters can also use trihydric alcohols, for example trimethylolpropane, glycerol, trishydroxyethyl isocyanurate, and castor oil.

The H-functional starter can also include polyether polyols, such as those with a number-average molar mass $M_n$ in the range from 200 to 4000 g/mol, such as 250 to 2000 g/mol. In certain embodiments, such polyether polyols are composed of repeating units of ethylene oxide and of propylene oxide, often having a proportion of from 35 to 100% of propylene oxide units, such as a proportion of from 50 to 100% of propylene oxide units. These can be random copolymers, gradient copolymers, or alternating or block copolymers of ethylene oxide and propylene oxide. Examples of suitable polyether polyols composed of repeating units of propylene oxide and/or of ethylene oxide are the Desmophen®, Acclaim®, Arcol®, Baycoll®, Bayfill®, Bayflex®, Baygal®, PET®, and polyether polyols from Covestro AG (e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® PPU 0789, Baygal® K55, and PET® 1004). Examples of other suitable homopolyethylene oxides are the Pluriol® F grades from BASF SE, and examples of suitable homopolypropylene oxides are the Pluriol® P grades from BASF SE, and examples of suitable mixed copolymers of ethylene oxide and propylene oxide are the Pluronic® PE or Pluriol® RPE grades from BASF SE.

Suitable H-functional starters can also include polyester polyols, such as those with a $M_n$ in the range from 200 to 4500 g/mol, such as 400 to 2500 g/mol. Polyester polyols are often composed of alternating acid units and alcohol units. Examples, but not necessarily limiting examples, of acid components used are succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, and mixtures of the acids and/or anhydrides mentioned. Examples, but not necessarily limiting examples, of alcohol components used are 1,2-ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, and mixtures of two or more of any of the foregoing. If dihydric or polyhydric polyether polyols are used as alcohol component, polyester ether polyols are obtained and can likewise serve as H-functional starter for the production of the polyether carbonate polyols. If polyether polyols are used for the production of the polyester ether polyols, it is sometimes desirable to use polyether polyols with a $M_n$ of from 150 to 2000 g/mol.

Other H-functional starters that can be used are polycarbonate polyols, for example polycarbonate diols, such as those with a $M_n$ of 150 to 4500 g/mol, such as 500 to 2500 g/mol, these being produced, for example, via reaction of phosgene, dimethyl carbonate, diethyl carbonate, or diphenyl carbonate and di- and/or polyhydric alcohols, or polyester polyols, or polyether polyols. Examples of polycarbonate polyols are described, for example, in U.S. Pat. No. 6,767,986, which is incorporated herein by reference. Polycarbonate diols used are commercially available and include, for example, the Desmophen® C grades from Covestro AG, e.g. Desmophen® C 1100 or Desmophen® C 2200.

Polyether carbonate polyols can likewise be used as H-functional starters. In particular, the polyether carbonate polyols described in this specification can themselves be used as H-functional starters. These polyether carbonate polyols used as H-functional starters are produced in advance for this purpose in a separate reaction step.

The functionality (i.e. number of H atoms per molecule that are active in relation to polymerization) of the H-functional starter is generally from 1 to 4, such as 2 or 3. The H-functional starters are used either individually or in the form of mixture of at least two H-functional starters.

In some embodiments of the present invention, the H-functional starter comprises an alcohol of the general formula (I),

HO—(CH$_x$)—OH     (I)

in which x is a number from 1 to 20, such as an even number from 2 to 20. Non-limiting examples of alcohols of formula (I) are ethylene glycol, 1,4-butanediol, 1,6-hexanediol, 1,8-octanediol, 1,10-decanediol, and 1,12-dodecanediol. Other suitable H-functional starters are neopentyl glycol, trimethylolpropane, glycerol, pentaerythritol, reaction products of the alcohols of formula (I) with ε-caprolactone, e.g. reaction products of trimethylolpropane with ε-caprolactone, reaction products of glycerol with ε-caprolactone, and also reaction products of pentaerythritol with ε-caprolactone. In some cases, the H-functional starter comprises water, diethylene glycol, dipropylene glycol, castor oil, sorbitol, and polyether polyols composed of repeating units of polyalkylene oxides.

In some embodiments, the H-functional starter comprises ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, and/or a di- and trihydric polyether polyol, where the polyether polyol is composed of a di- or tri-H-functional starter substance and propylene oxide or of a di or tri-H-functional starter substance, propylene oxide, and ethylene oxide. The $M_n$ of the polyether polyol is, in certain embodiments, in the range from 62 to 4500 g/mol, such as 62 to 3000 g/mol, or 62 to 1500 g/mol. The OH functionality of the polyether polyols is, in many embodiments, 2 to 3.

In certain embodiments of the present invention, the polyether carbonate polyol having an incorporated carbon dioxide content is the addition reaction product of carbon dioxide and alkylene oxide(s) onto H-functional starter(s) with the use of a multimetal cyanide catalyst (DMC catalyst).

DMC catalysts suitable for use in preparing such polyether carbonate polyols are disclosed, for example, in U.S. Pat. Nos. 3,404,109, 3,829,505, 3,941,849, and 5,158,922. DMC catalysts described by way of example in U.S. Pat. No. 5,470,813, EP 700 949 A, EP 743 093 A, EP 761 708 A, WO 97/40086 A, WO 98/16310 A and WO 00/47649 A have very high activity in the homopolymerization of epoxides, and permit the production of polyether polyols at very low catalyst concentrations (25 ppm or less). The high-activity DMC catalysts described in EP-A 700 949 are a typical example, and comprise not only a double metal cyanide compound (e.g. zinc hexacyanocobaltate(III)) and an organic ligand (e.g., tert-butanol), but also a polyether with a number-average molar mass greater than 500 g/mol.

The amount of DMC catalyst used is, in certain embodiments, less than 1% by weight, such as less than 0.5% by weight, less than 500 ppm, or, in some cases, less than 300 ppm, based on the total weight of the polyether carbonate polyol.

In certain embodiments, the polyether carbonate polyol is produced in a pressure reactor. In such embodiments, one or more alkylene oxides, and the carbon dioxide, are metered into the system after the optional drying of a starter substance or of the mixture of a plurality of starter substances, and after the addition of the DMC catalyst and also of any additive(s), these being added in the form of solid or in the form of a suspension before or after the drying process. In principle, various methods can be used for the metering of one or more alkylene oxides and of the carbon dioxide into the system. The metering can be started in vacuo or at a preselected admission pressure. It is sometimes desirable to set the admission pressure via introduction of an inert gas, for example nitrogen, where the pressure set is from 10 mbar to 5 bar, such as 100 mbar to 3 bar, or, in some cases, 500 mbar to 2 bar.

The metering of one or more alkylene oxides and of the carbon dioxide into the system can take place simultaneously or sequentially, and the entire quantity of carbon dioxide can be added all at once or metered into the system during the reaction time. One or more alkylene oxides is/are metered into the system simultaneously or sequentially in relation to the metering of the carbon dioxide into the system. If a plurality of alkylene oxides are used for the synthesis of the polyether carbonate polyols, these can be metered into the system simultaneously or sequentially by way of respective separate feeds, or by way of one or more feeds where at least two alkylene oxides are metered in the form of mixture into the system. It is possible to synthesize random, alternating, block-type, or gradient-type polyether carbonate polyols by varying the way in which the alkylene oxides and the carbon dioxide are metered into the system.

In some embodiments, an excess of carbon dioxide is used, in which the quantity of carbon dioxide is determined by way of the total pressure under reaction conditions. An excess of carbon dioxide can be advantageous because carbon dioxide is unreactive. The reaction can produce the polyether carbonate polyols at from 60° to 150° C., such as 70° C. to 140° C., or, in some cases, 80° C. to 130° C., and at pressures of from 0 to 100 bar, such as 1 to 90 bar, or, in some cases, 3 to 80 bar.

In certain embodiments of the present invention, polyether carbonate polyol is present in an amount of at least 1% by weight, at least 2% by weight, at least 5% by weight, such as 2% to 50% by weight, 2% to 30% by weight, 2% to 20% by weight, 4 to 20% by weight, or, in some cases 4% to 10% by weight, based on the total weight of the isocyanate-reactive composition. In certain embodiments of the present invention, polyether carbonate polyol is present in an amount of at least 2% by weight, at least 4% by weight, at least 10% by weight, at least 15% by weight, including 2% to 80% by weight, 5% to 50% by weight, 10% to 50% by weight, or, in some cases, 10% to 30% by weight or 20% to 30% by weight, based on the total weight of isocyanate-reactive components, such as polyols, present in the isocyanate-reactive composition. As will be appreciated, the isocyanate-reactive composition may include a mixture of two or more different polyether carbonate polyols.

In certain embodiments, in addition to the polyether carbonate polyols described above, the isocyanate-reactive composition comprises other isocyanate-reactive components, such as other polyols. For example, in certain embodiments, the isocyanate-reactive composition further comprises a polyether polyol (that is not a polyether carbonate polyol) having a nominal functionality of at least 3 include those having a nominal functionality of, for example, 3 to 8, 3 to 6, or, in some cases 3 to 4, or, in yet other cases, 3 (a triol). As used herein, "nominal functionality" means the average number of active hydrogen groups on the initiator or initiator blend used in producing the polyol. In certain embodiments, the average OH (hydroxyl) number of such polyether polyols is at least 20, such as at least 25, or, in some cases, at least 30 and no more than 100, such as no more than 80, or, in some cases, no more than 75.

In certain embodiments, such polyether polyols are the reaction product of one or more suitable H-functional starters and one or more alkylene oxides. Suitable H-functional starters and alkylene oxides include any of those mentioned above with respect to the preparation of the polyether carbonate polyols. In certain embodiments, the alkylene oxide comprises a mixture of ethylene oxide and propylene oxide, wherein the total amount of copolymerized oxyethylene in the resultant polyether polyol is less than 30%, in some cases no more than 25%, by weight, based on the total weight of oxyalkylene used.

A common process for polymerizing such polyols is the base catalyzed addition of the oxide monomers to the active hydrogen groups of the H-functional starter(s) and subsequently to the oligomeric polyol moieties. Potassium hydroxide or sodium hydroxide are common basic catalysts that are used. Polyols produced by this process can contain significant quantities of unsaturated monols resulting from the isomerization of oxypropylene monomer to allyl alcohol under the conditions of the reaction. This monofunctional alcohol can then function as an active hydrogen site for further oxide addition.

Alternatively, polyethers polyols that are low unsaturation (low monol) poly(oxypropylene/oxyethylene) polyols manufactured with a DMC catalyst can be used. These poly(oxypropylene/oxyethylene) low unsaturation polyols are prepared by oxyalkylating a suitable H-functional starter with propylene oxide and ethylene oxide in the presence of a DMC catalyst, such as any of those DMC catalysts mentioned above with respect to the preparation of polyether carbonate polyols. The amount of ethylene oxide in the ethylene oxide/propylene oxide mixture may be increased during the latter stages of the polymerization to increase the primary hydroxyl content of the polyol. Alternatively, the low unsaturation polyol may be capped with ethylene oxide using non-DMC catalysts.

When the oxyalkylation is performed in the presence of DMC catalysts, it is sometimes desirable that initiator molecules containing strongly basic groups, such as primary and secondary amines, be avoided. Further, when employing DMC complex catalysts, it is sometimes desirable to oxyalkylate an oligomer which comprises a previously oxyalkylated "monomeric" initiator molecule. The polyoxyalkylene oligomeric initiators may be prepared by oxyalkylating a "monomeric" initiator in the presence of traditional basic catalysts such as sodium or potassium hydroxide or other non-DMC catalysts. It may be necessary to neutralize and/or remove these basic catalysts prior to addition and initiation of the DMC catalyst.

In certain embodiments, such polyether polyol(s) having a nominal functionality of at least 3 are present in the isocyanate-reactive composition in an amount of 10% to 90% by weight, such as 20% to 80% by weight, 30% to 70% by weight, or, in some cases, 40% to 60% by weight or 40% to 50% by weight, based on the total weight of isocyanate-reactive components in the isocyanate-reactive composition. In certain embodiments of the present invention, such polyether polyol(s) is present in an amount of 2% to 50% by weight, such as 2% to 25% by weight, 5% to 20% by weight or, in some cases 10% to 20% by weight, based on the total weight of the isocyanate-reactive composition.

In certain embodiments of the present invention, the isocyanate-reactive composition further comprises one or more polyether diols (that are not polyether carbonate diols), such as polyethylene glycols, polypropylene glycols and mixtures thereof. In certain embodiments, the polyether diol has a $M_n$ of at least 1000 grams/mole and/or up to 4000 grams/mole, such as, for example, from 1500 to 2500 grams/mole.

In certain embodiments, the polyether diol is present in the isocyanate-reactive composition in an amount of 5% to 25% by weight, such as 10% to 20% by weight, based on the total weight of isocyanate-reactive components in the isocyanate-reactive composition. In certain embodiments of the present invention, such polyether diol(s) are present in an amount of 1% to 20% by weight, such as 2% to 10% by weight, 2% to 8% by weight or, in some cases 4% to 6% by weight, based on the total weight of the isocyanate-reactive composition.

In certain embodiments of the present invention, the isocyanate-reactive composition also comprises one or more chain extenders that have a molecular weight of 60 to 490 g/mol, such as 62 to 400 g/mol, or, in some cases, 62 to 300 g/mol, and two isocyanate-reactive groups, such as diols, diamines, and diol/diamine mixtures.

Specific examples of suitable chain extenders are diols such as ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, diesters of terephthalic acid with glycols having from 2 to 4 carbon atoms, for example bis(ethylene glycol) terephthalate or bis(1,4-butanediol) terephthalate, hydroxyalkylene ethers of hydroquinone, for example 1,4-di(hydroxyethyl)hydroquinone, and ethoxylated bisphenols, and also reaction products of these with ε-caprolactone. In some embodiments, the chain extender comprises an aliphatic diol having from 2 to 14 carbon atoms, for example ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, and 1,4-di(hydroxyethyl) hydroquinone. Other suitable chain extenders are (cyclo) aliphatic diamines, for example, isophoronediamine, ethylenediamine, 1,2-propylenediamine, 1,3-propylenediamine, N-methylpropylene-1,3-diamine, N,N'-dimethylethylenediamine, and aromatic diamines, for example 2,4-tolylenediamine and 2,6-tolylenediamine, 3,5-diethyl-2,4-tolylenediamine, and 3,5-diethyl-2,6-tolylenediamine, and primary mono-, di-, tri-, or tetraalkyl-substituted 4,4'-diaminodiphenylmethanes.

In certain embodiments, chain extender is present in the isocyanate-reactive composition in an amount of 5% to 25% by weight, such as 10% to 20% by weight, based on the total weight of isocyanate-reactive components in the isocyanate-reactive composition. In certain embodiments of the present invention, chain extender is present in an amount of 1% to 20% by weight, such as 2% to 10% by weight, 2% to 8% by weight or, in some cases 4% to 6% by weight, based on the total weight of the isocyanate-reactive composition.

In certain embodiments of the present invention, the isocyanate-reactive composition and polyisocyanate are each used in amounts such that the reaction mixture used to make the polyurethane coating covering the portion of the fiber bundles tufted into the primary backing has an NCO Index (i.e., the ratio of the total number of reactive isocyanate groups present to the total number of isocyanate-reactive groups that can react with the isocyanate multiplied by 100) of 90 to 300, such as 99 to 120, 100 to 110 or, in some cases, the NCO index is 105.

The isocyanate-reactive composition, in some embodiments of the present invention, also comprises other ingredients, including, but not necessarily limited to, catalysts, surfactants, blowing agents, release agents, pigments, cell regulators, flame retarding agents, plasticizers, dyes, antistatic agents, antimicrobials, antioxidants, UV stabilizers, mineral oils, fillers and reinforcing agents such as glass in the form of fibers or flakes or carbon fibers.

Suitable catalysts for use in the isocyanate-reactive composition include, for example, the various polyurethane catalysts which are known to be capable of promoting the reaction between the polyisocyanate component and the isocyanate-reactive components. Examples of such catalysts include, but are not limited to, tertiary amines and metal compounds. Some examples of suitable tertiary amine catalysts include triethylamine, tributylamine, N-methylmorpholine, N-ethyl-morpholine, N,N,N',N'-tetra-methylethylene diamine, pentamethyl-diethylene triamine, and higher homologs, 1,4-diazabicyclo[2.2.2]octane, N-methyl-N'-(dimethylaminoethyl) piperazine, bis(dimethylaminoalkyl)-piperazines, N,N-dimethylbenzylamine, N,N-dimethylcyclohexylamine, N,N-diethylbenzylamine, bis(N,N-diethylaminoethyl) adipate, N,N,N,N-tetramethyl-1,3-butanediamine, N,N-dimethyl-β-phenylethylamine, 1,2-dimethylimidazole, 2-methylimidazole, monocyclic and bicyclic amidines, bis(dialkylamino)alkyl ethers, and tertiary amines containing amide groups (such as formamide groups). The catalysts used may also be the known Mannich bases of secondary amines (such as dimethylamine) and aldehydes (such as formaldehyde) or ketones (such as acetone) and phenols.

In certain embodiments of the present invention, the catalyst composition comprises a mixture of "non-emissive amine catalysts" having isocyanate reactive functionalities that react into the polyurethane matrix, thereby not contributing to emissions. Examples of such catalysts include triethanolamine, triisopropanoamine, N-methyldiethanolamine, N-ethyl-diethanolamine, N,N-dimethylethanolamine, their reaction products with alkylene oxides (such as propylene oxide and/or ethylene oxide) and secondary-tertiary amines. One specific example of such a "non-emissive amine catalyst" is N,N,N'-trimethyl-N'-3-aminopropyl-bis(aminoethyl)ether, commercially available as Dabco® NE 300, from Air Products and Chemicals Inc.

Other suitable catalysts include organic metal compounds, such as organic tin, bismuth, and zinc compounds. Suitable organic tin compounds include those containing sulfur, such as dioctyl tin mercaptide, and, in some cases, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts.

Suitable surfactants for use in the isocyanate-reactive composition include silicone surfactants such as, for example, polysiloxanes and siloxane/poly(alkylene oxide) copolymers of various structures and molecular weights. The structure of these compounds is generally such that a copolymer of ethylene oxide and propylene oxide is attached to a polydimethyl siloxane radical. Such surfactants are known and described in, for example, U.S. Pat. No. 2,764,565, U.S. Pat. No. 3,887,500 and U.S. Pat. No. 3,957,842, the disclosures of which are hereby incorporated by reference. It is sometimes desirable to use surfactants in amounts of from 0.05 to 5% by weight, such as 0.2 to 3% by weight, based on the total weight of the isocyanate-reactive composition.

Examples of suitable commercially available surfactants include the silicone surfactants B-4690, B-4113 and B-8250, B-2370, B-8707, B-8228, B-8002 and their low fogging (LF) versions, which are available from DeGussa/Goldschmidt and the silicone surfactants Niax U-2000, L-620, L-636, L-5614, L-5639, L-626, and L-627, which are commercially available from Momentive and the silicone surfactants Dabco DC5164, DC5169, and DC5043 which are available from Air Products.

In certain embodiments of the present invention, the isocyanate-reactive composition further comprises a filler, often in a substantial amount for the benefit of, for example, cost reduction, fire resistance or other properties. Suitable fillers include, but are not limited to, silicates, $TiO_2$, glass fibers, carbon black, graphite, calcium carbonate, talc, mica, and clays. In certain embodiments, for example, such filler is present in the isocyanate-reactive composition in an amount of 20 to 80% by weight, 40 to 80% by weight, or 50% to 70% by weight, based on the total weight of the isocyanate-reactive composition.

In addition to the fiber bundles, primary backing, and coating, the carpet may also include other layers, such as a secondary backing and a foam layer. Typically, the carpet 10 is deposited over a subsurface 80.

Furthermore, particularly in the case of synthetic turf, the synthetic turf may also comprise an infill 30. "Infill" herein refers to particles that are disposed and dispersed in between the vertically oriented fibers bundles 20. One of the functions of the infill is to maintain the fibers in a position such that they extending substantially vertically away from the primary backing 40, thereby enabling an appearance simulating natural turf or grass.

Suitable infill particles include, for example, rubber particles. In some embodiments, the rubber particles have a coating, such as a polyurethane coating, deposited over at least a portion of the rubber particle. For example, in some cases, the polyurethane coating may comprise: (1) a polyurethane that is a reaction product of a reaction mixture comprising: (i) a polyol having a Mn of 1800 to 12,000; (ii) an aromatic diamine; (iii) a polyisocyanate; and (iv) a catalyst for the reaction between hydroxyl groups and isocyanate groups; and (2) a solid particle anti-clumping agent.

The infill particles are discrete, closed, three dimensionally shaped objects that can have any of a variety of shapes, including, for example, generally spherical or elongated. In certain embodiments, the particles have an aspect ratio of from 1:1 (a perfect sphere) up to 1:100, up to 1:50, up to 1:20, or, in some cases, up to 1:10 or up to 1:5. As used herein, the "aspect ratio" of a particle is the ratio of the length of the shortest dimension of the particle to the length of the longest dimension of the particle.

In certain embodiments, the infill particles are free-flowing particles, which, as used herein, means that the particle that is not an aggregate of particles stuck or adhered to each other so as to form clumps. In some embodiments, "free-flowing particles" have an angle of repose that is less than, for example, 60° degrees when the particles are passed through a 10 mesh sieve. Moreover, in some embodiments, the free-flowing particles are such that at least 85% by weight, such as at least 90% by weight, or, in some cases, at least 95% by weight, of the particles are pourable after 1 week at 140° F./95% relative humidity.

The term "rubber", as used herein, refers to vulcanized elastomer materials that exhibit large and reversible elongations at low stresses. Rubbers are generally amorphous with a low glass transition temperature and some degree of crosslinking (vulcanization) to impart elastic material properties. Rubbers include, but are not limited to, natural and synthetic polyisoprene, polychloroprene (neoprene), polybutadiene, polyacrylonitrile, poly(styrene-co-butadiene), poly(acrylonitrile-co-butadiene), poly(isobutylene-co-isoprene), polysulfide rubbers, ethylene propylene diene monomer (EPDM) rubbers, butyl rubber, silicone rubbers, and the like. Rubber also includes blends and other combinations of vulcanized elastomer materials, including, but not limited to, tire rubber.

In some embodiments, the rubber particles are "crumb rubber". As used herein, the term "crumb rubber" refers to particles derived by reducing scrap rubber tire or other rubber material into particles. Generally, crumb rubber production processes for recycling tires include operations to remove any reinforcing materials such as steel and fiber, along with other contaminants such as dust, glass, rocks, and the like. Crumb rubber production processes include, but are not limited to, the grinding of vulcanized (crosslinked) rubber (for example, tire rubber) into crumb rubber particles of various sizes under ambient or cryogenic conditions.

Non-limiting examples of cryogenic grinding processes and apparatuses that produce rubber particles from recycled tires are described in U.S. Pat. Nos. 7,093,781; 7,108,207; and 7,445,170, which are incorporated by reference herein. In some embodiments, the particles comprise crumb rubber particles produced by the processes and/or with the apparatuses described in U.S. Pat. Nos. 7,093,781; 7,108,207; and/or 7,445,170. Such crumb rubber particles are also commercially available and include, for example, and include the PolyDyne™ and the MicroDyne™ lines of products commercially available from Lehigh Technologies Inc., Tucker, Ga., USA.

Tire rubber includes various different types of rubbers depending, for example, on the formulation, the type of tire, and the spatial location of the rubber material within the tire structure. In some embodiments of rubber particles produced from recycled tires, the rubber particles may contain a combination of several different rubbers, as well as other tire material components, such as, for example, thermoplastic polymers, carbon black, silica, clays, anti-oxidant compounds, anti-ozonant compounds, free sulfur, other free vulcanizing agents, oils, residual fibers, residual steel, other residual contaminants, and the like.

In certain embodiments, the rubber particles are produced from rubber recycled from non-tire sources or, in some embodiments, the rubber particles are produced from a virgin rubber or combinations of virgin rubbers. Rubber particles suitable for use in the present invention may also include various additives, for example, ingredients known in the art of rubber material production and processing.

In some embodiments, the rubber particles have an average particle size of 40 Mesh to 300 Mesh, as determined according to ASTM D5644-01. For example, in various embodiments, the average particle size of rubber particles used in the present invention may be no larger than 40 Mesh (approximately 400 microns), 80 Mesh (approximately 177 microns), 140 Mesh (approximately 105 microns), 200 Mesh (approximately 74 microns), or 300 Mesh (approximately 50 microns), as determined according to ASTM D5644-01.

In certain embodiments, the rubber particles have an average particle size in the range of 50 microns to 500 microns.

In some embodiments of the present invention, the infill comprises rubber particles that comprise a coating deposited over at least a portion of the rubber particle. In certain embodiments, the coating is a substantially or, in some cases, completely continuous film that covers at least 50%, at least 60%, at least 70%, at least 80%, at least 90%, or, in some cases, 100% of the surface of the rubber particle. In certain embodiments, the coating has a maximum film thickness of no more than 20 microns, such as no more than 10 microns, no more than 8 microns, no more than 7 microns, or, in some cases, no more than 6 microns.

The coating that is deposited over at least a portion of the rubber particle, in certain embodiments, includes a polyurethane-urea resin that is a reaction product of a reaction mixture, such as a reaction mixture comprising: (a) an isocyanate-reactive composition; (b) a polyisocyanate; and (c) a catalyst for the reaction between hydroxyl groups and isocyanate groups.

In some embodiments, the isocyanate-reactive composition comprises a polyol having a $M_n$ of 1800 to 12,000, such as 3000 to 7000 or 5000 to 7000.

In certain embodiments, such a polyol comprises a polyether polyol, such as those having at least 2, such as 2 or 3 hydroxyl groups per molecule and may be prepared, for example, by polymerization of epoxides, such as ethylene oxide, propylene oxide, butylene oxide, tetrahydrofuran, styrene oxide or epichlorohyrin, either on their own, in the presence of $BF_3$, or by a process of chemical addition of these epoxides, optionally as mixtures (such as mixtures of ethylene oxide and propylene oxide) or successively, to starting components having reactive hydrogen atoms, such as water, ammonia, alcohols, or amines. Examples of suitable starting components include ethylene glycol, propylene glycol-(1,3) or -(1,2), glycerol, trimethylolpropane, 4,4'-dihydroxy-diphenylpropane, aniline, ethanolamine or ethylene diamine. Sucrose-based polyether polyols may also be used. It is in many cases preferred to use polyethers which contain predominant amounts of primary OH groups (up to 90%, by weight, based on all the OH groups present in the polyether).

Also suitable are polyols which contain high molecular weight polyadducts or polycondensates in a finely dispersed form or in solution. Such compounds are obtained when polyaddition reactions (e.g. reactions between polyisocyanates and amino functional compounds) or polycondensation reactions (e.g. between formaldehyde and phenols and/or amines) are directly carried out in situ in the above-mentioned hydroxyl compounds. Processes for the production of this type of material have been described in German Auslegeschriften No. 1,168,075 and No. 1,260,142 and in German Offenlegungsschriften Nos. 2,324,134; 2,423,984; 2,512,385; 2,513,815; 2,550,796; 2,550,797; 2,550,833 and No. 2,550,862. Such polyhydroxyl compounds may also be obtained according to U.S. Pat. No. 3,869,413 or German Offenlegungsschrift No. 2,550,860 by mixing an aqueous polymer dispersion with a polyhydroxyl compound and then removing water from the mixture.

In certain embodiments, such a polyol comprises a polyester polyol, such as reaction products of polyhydric, such as dihydric alcohols and/or trihydric alcohols, and polybasic, such as dibasic, carboxylic acids. Instead of free polycarboxylic acids, the corresponding polycarboxylic acid anhydrides or corresponding polycarboxylic acid esters of lower alcohols or mixtures thereof may be used. The polycarboxylic acids may be aliphatic, cycloaliphatic, aromatic and/or heterocyclic and they may be substituted, e.g. by halogen atoms, and/or may be unsaturated. Suitable exemplary polycarboxylic acids include, but are not limited to, succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. Exemplary suitable polyhydric alcohols include, but are not limited to, ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxy-methylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as ε-caprolactone, or hydroxycarboxylic acids, such as ε-hydroxycaproic acid, may also be used.

Such polyols may also comprise polycarbonate polyols, such as the reaction product of diols, such as propanediol-(1,3), butanediol-(1,4) and/or hexanediol-(1,6), diethylene glycol, triethylene glycol or tetraethylene glycol, with diarylcarbonates, such as diphenylcarbonate, or phosgene.

In certain embodiments, the polyol having a number average molecular weight of 1800 to 12,000, as described above, is present in an amount of at least 50% by weight, such as at least 60% by weight, based on the total weight of the isocyanate-reactive composition used to make the coating on the rubber particle.

In some embodiments, the isocyanate-reactive composition used to make the infill particles also comprises an aromatic diamine, such as those which contain at least one alkyl substituent in the ortho-position to a first amino group and two alkyl substituents in the ortho-position to a second amino group or mixtures thereof. In some embodiments, at least two of said alkyl substituents contain at least two carbon atoms. In certain embodiments, the reactivity of said diamine towards isocyanates has not been reduced by electron attracting substituents, such as halogen, ester, ether or disulphide groups, as is the case, for example, with methylene-bis-chloroaniline (MOCA). In certain embodiments, such diamines do not contain other functional groups reactive with isocyanates. In certain embodiments, the foregoing mentioned alkyl substituent can have as many as twenty carbon atoms and can be straight or branched long chains.

In certain embodiments, the aromatic diamine contains at least one alkyl substituent in the ortho-position to a first amino group and two alkyl substituents having from 1 to 3 carbon atoms in the ortho-position to a second amino group, provided that two of these alkyl substituents contain two or three carbon atoms. Examples of such aromatic diamines include: 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

The above-mentioned aromatic amines may, of course, be used as mixtures with each other or in combination with other active aromatic amines.

In certain embodiments, aromatic diamines which have a linear alkyl substituent having from 1 to 3 carbon atoms in both ortho-positions to each amino group, provided that two of the alkyl substituents contain two or three carbon atoms, are used. In some embodiments, the diamine is liquid at room temperature and miscible with polyols, particularly with polyether polyols. An example of such a compound is 1-methyl-3,5-diethyl-2,4-diaminobenzene or a mixture of this compound with 1-methyl-3,5-diethyl-2,6-diaminobenzene.

In certain embodiments, the aromatic amine is present in an amount of 5 to 50% by weight, such as 10 to 30% by weight, or, in some cases, 15 to 25% by weight, based on the total weight of the isocyanate-reactive composition used to make the infill particles.

In certain embodiments, the isocyanate-reactive composition used to make the infill particles also comprises an aminosilane having the formula:

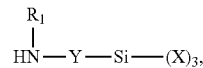

in which: (A) each X, which may be the same or different, is an organic group that is inert to isocyanate groups below 100° C., provided that at least one of these groups are alkoxy or acyloxy groups, such as where each X is an alkyl or alkoxy group having 1 to 4 carbon atoms, such as where each X is an alkoxy group having 2 carbon atoms; (B) Y is a linear or branched alkylene group containing 1 to 8 carbon atoms, such as a linear group containing 2 to 4 carbon atoms or a branched group containing 5 to 6 carbon atoms, such as a linear group containing 3 carbon atoms; and (C) $R_1$ is hydrogen or an organic group which is inert to isocyanate groups at a temperature of 100° C. or less, such as an alkyl, cycloalkyl, or aromatic group having 1 to 12 carbon atoms, or $R^1$ represents a group corresponding to the formula:

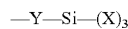

in which X and Y have the same meanings described above.

In certain embodiments, each X represents a methoxy, ethoxy, or propoxy group, and Y is a linear alkylene group containing 3 carbon atoms (i.e., a propylene group) and $R_1$ is hydrogen.

In certain embodiments, the aminosilane is present in an amount of 0.1 to 10% by weight, such as 1 to 5% by weight, or, in some cases, 2 to 4% by weight, based on the total weight of the isocyanate-reactive composition used to make the infill particles.

In some embodiments, the isocyanate-reactive composition used to make the infill particles also comprises a low molecular weight polyol having a $M_n$ of from 250 to less than 1,800, such as from 250 to less than 1,500 or 250 to 800; a number averaged equivalent weight of from 80 to 750, such as from 85 to 300; and a number averaged isocyanate reactive group functionality of from 2 to 10, such as 2 to 4 or 2 to 3. Such compounds include, for example, polyether or polyester polyols containing primary and/or secondary hydroxyl groups.

In certain embodiments, such a low molecular weight polyol is present in an amount of 1 to 15% by weight, such as 5 to 15% by weight, based on the total weight of the isocyanate-reactive composition used to make the infill particles.

As indicated, the coating that is deposited over at least a portion of the rubber particle includes a product of a reaction mixture that comprises a polyisocyanate. Suitable polyisocyanates include any aromatic, aliphatic, and/or cycloaliphatic polyisocyanates, including those mentioned above with respect to the manufacture of the coating 70 that is described earlier. In certain embodiments, however, the polyisocyanate that is used to make the coating on the rubber particle is selected so as to have a viscosity, at 25° C., of no more than 300 mPa·s, when measured using a Brookfield DVE viscometer, spindle #6. One example of a suitable polyisocyanate is that which is commercially available from Covestro LLC under the name Mondur® MR 5 (a polymeric diphenylmethane diisocyanate (pMDI) containing pure (monomeric) MDI, NCO content of at least 31.8 wt % and viscosity at 25° C. of 50-90 mPa·s).

In certain embodiments, in the manufacture of the coated rubber particles, the polyisocyanate and isocyanate-reactive composition are each used in amounts such that the reaction mixture has an NCO Index is at least 90, such at least 99, or at least 100 and no more than 300, such as no more than 110 or, in some cases, no more than 105. In certain embodiments, the NCO index is 105.

The reaction mixture used to make the coated rubber particles, in some embodiments, also comprises a catalyst for the reaction between hydroxyl groups and isocyanate groups. Suitable catalysts include, for example, organic tin compounds such as tin (II) salts of carboxylic acids (such as tin (II) acetate, tin (II) octoate, tin (II) ethyl hexoate or tin (II) laurate), and the dialkyl tin salts of carboxylic acids (such as dibutyl tin diacetate, dibutyl tin dilaurate, dibutyl tin maleate or dioctyl tin diacetate) either alone or as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines.

Other catalysts which may be used include tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylamino-ethyl)-adipate, N,N-diethylbenzylamine, pentamethyl-diethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

Tertiary amines having isocyanate-reactive hydrogen atoms include, for example, triethanolamine, triisopropanolamine, N-methyl-diethanolamine, N-ethyl-diethanolamine, and N,N-dimethyl-ethanolamine may also be used. Reaction products of these compounds with alkylene oxides, such as propylene oxide and/or ethylene oxide are also suitable.

Silaamines having carbon-silicon bonds as described, e.g. in German Pat. No. 1,229,290 may also be used as catalysts. Examples include 2,2,4-trimethyl-2-silamorpholine or 1,3-diethylaminomethyl-tetramethyl-disiloxane.

Basic nitrogen compounds, such as tetraalkylammonium hydroxides, alkali metal hydroxides such as sodium hydroxide, alkali metal phenolates, such as sodium phenolate, and alkali metal alcoholates, such as sodium methylate, may also be used as catalysts. Hexahydrotriazines are also suitable catalysts.

In certain embodiments, the catalyst comprises (i) an organic tin compound, such as a dialkyl tin salt of carboxylic acid, such as dibutyl tin dilaurate, and (ii) a tertiary amine, such as 1,4-diaza-bicyclo-(2,2,2)-octane. In certain embodiments, the relative weight ratio of (i) to (ii) is 20:80 to 80:20, such as 40:60 to 60:40.

The reaction mixture used in the manufacture of the coated rubber particles may comprise any of a variety of optional ingredients, such as, but not limited to, blowing agents, such as water and/or volatile organic substances and/or dissolved inert gases, examples of which include ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane; butane; hexane; heptane; diethyl ether; nitrogen; air; and carbon dioxide Surface-active additives (emulsifiers and foam stabilizers) may also be used. Examples include the sodium salts of ricinoleic sulphonates or of fatty acids, or salts of fatty acids with amines, such as oleic acid diethylamine or stearic acid diethanolamine, alkali metal or ammonium salts of sulphonic acids, such as dodecylbenzene sulphonic acid or dinaphthylmethane disulphonic acid, or of fatty acids, such as ricinoleic acid, or of polymeric fatty acids, and water-soluble polyether siloxanes that have a polydimethylsiloxane group attached to a copolymer of ethylene oxide and propylene oxide.

Cell regulators, such as paraffins or fatty alcohols or dimethylpolysiloxanes, pigments, dyes, flame retarding agents, such as bis-chloroethylphosphate or ammonium phosphate and polyphosphate, stabilizers against ageing and weathering, plasticizers, fungistatic and bacteriostatic substances and fillers, such as barium sulphate, carbon black or whiting, may also be used.

In certain embodiments, the reaction mixture is present in an amount of at least 0.5% by weight, such as at least 1% by weight or at least 2% by weight and up to 20% by weight, up to 10% by weight, or, in some cases, up to 6% by weight, based on the total weight of rubber particles.

As previously indicated, the coating deposited over at least a portion of the rubber particle may also include a solid particle anti-clumping agent. Anti-clumping agents are materials that, when present in the coating in an effective amount, act to prevent the free-flowing particles from clumping or aggregating, thereby enabling the production of the free-flowing and pourable particles described herein even after being stored for 1 week at 140° F./95% relative humidity.

Suitable solid anti-clumping agents include, for example, silica, such as fumed silica, organic bentonite, hydrogenated castor oil and polyamides. In certain embodiments, the anti-clumping agents do not impart any color to the coating when viewed by the naked eye and, as such, do not act as a colorant.

In certain embodiments, the solid particle anti-clumping agent has an average particle size of at least 0.1 microns, such as at least 0.5 microns and no more than 10 microns, such as no more than 5 microns.

The solid particle anti-clumping agent is employed in an amount effective to produce the free-flowing, pourable particles described herein. In certain embodiments, the solid particle anti-clumping agent, such as fumed silica, is present in an amount of at least about 0.5% by weight, such as at least 1% by weight or, in some cases, at least 5% by weight and up to 20% by weight, such as up to 10% by weight, based on the total weight of the reaction mixture. In certain embodiments, the solid particle anti-clumping agent is present in an amount of at least 0.05% by weight, such as at least 0.1% by weight, or, in some cases, at least 0.2% by weight and up to 2% by weight, such as up to 1% by weight, or, in some cases, up to 0.5% by weight, based on the total weight of the sum of the reaction mixture and the rubber particles.

Coated rubber crumb particles that are suitable for use as infill in the synthetic turf structures of the present invention are described in U.S. patent application Ser. No. 14/713,699, which is incorporated herein by reference.

The thickness of the infill layer can be, for example, within the range of 1 to 4 inches (2.54 to 10.16 centimeters) depending on the end use of the surface.

As indicated above, it was a surprising discovery that, by utilizing an isocyanate-reactive composition comprising a sufficient amount of a polyether carbonate polyol having incorporated carbon dioxide content in the manufacture of the coating 70 in certain carpets, such as synthetic turfs, the tuftbind properties of the carpet, such as synthetic turf, could be substantially improved relative to the use of a similar isocyanate-reactive composition that does not include a polyether carbonate polyol having incorporated carbon dioxide content.

The non-limiting and non-exhaustive examples that follow are intended to further describe various non-limiting and non-exhaustive embodiments without restricting the scope of the embodiments described in this specification.

Examples

Greige goods (long strand polyethylene face fibers tufted into primary and secondary woven polyester backings and extending approximately 2 inches (5.08 cm) from the backings) were cut to a suitable size to be attached to a 15"×15" (38.1 cm×38.1 cm) metal plate using binder clips. The metal plate with greige good affixed with binder clips was then placed into an oven having a temperature of 180° F.-200° F. (82.2° C.-93.3° C.).

Compositions were prepared using the ingredients and amounts (in parts by weight) listed in the following table.

| Component | Chemical Name | Example A | Example B | Example C |
|---|---|---|---|---|
| 1 | Polyol 1[1] | 194.1 | 133.2 | 102.5 |
| 2 | Polyol 2[2] | 53.9 | 54 | 54.1 |
| 3 | Diethylene Glycol | 48.3 | 47.6 | 47.3 |
| 4 | Polyol 3[3] | 0 | 61.46 | 92.3 |
| 5 | Filler Wetting Agent[4] | 2.79 | 2.8 | 2.8 |
| 6 | Calcium Carbonate | 600 | 600 | 600 |
| 7 | ISOCYANATE[5] | 174.6 | 174.6 | 174.6 |
| 8 | MC Catalyst SND[6] | .919 | .92 | .92 |
|  | Index (100 Isocyanate/Polyol) | 105 | 105 | 105 |

[1] A 5,000-molecular-weight polyoxyalkylene polyol, specifically an ethylene oxide adduct of a polyoxypropylene triol; hydroxyl number 34.1-37.3 mg KOH/g.
[2] A 2,800-molecular weight polypropylene oxide-based diol specially modified with ethylene oxide; hydroxyl number 38.5-41.5 mg KOH/g; viscosity of approximately 490 cps @ 25° C.
[3] A polyethercarbonate polyol having an OH functionality of about 3, an incorporated carbon dioxide content about 14% by weight and an OH# of 51.5 to 55.5.
[4] A nonionic and anionic surfactant blend commercially as Code 5027 from Fibro Chem LLC.
[5] Modified polymeric diphenylmethane polyisocyanate; viscosity of 240-395 mPas at 25 C.; NCO, weight % 26.9-27.7
[6] Organotin mixture catalyst commercially available from Manufacturer's Chemicals, LLC The following procedure was used to prepare each example. To combine the components, a tilt head countertop stand mixer utilizing a 6-wire whip which quickly incorporated air into the blend was used. A tilt head three-quart stainless steel mixing bowl was used.

Beginning with an empty tilt head stainless steel bowl, each polyol was added individually and mixed at high speed for thirty seconds before the next polyol component addition. The wetting agent was then added to the polyol blend and mixed for one minute at high speed on the stand mixer. The calcium carbonate was then slowly added to the blend while mixing at a very low speed. Once the filler was wet-out, the blend was mixed at high speed for six minutes. After the filler had been thoroughly mixed, the isocyanate was added and mixed for one minute. The mixer was then stopped and the walls inside of the bowl were scraped to ensure that the components are not allowed to stick to the side of the stainless steel bowl. After scraping the bowl, the components were mixed for an additional one minute at high speed in tilt head stand mixer. The mixer was then stopped to add catalyst to the blend and then mixed again for thirty seconds. Once again the mixer was stopped to scrape the walls inside of the bowl and then mixing was conducted again for an additional thirty seconds at high speed. The stainless steel bowl was quickly removed from the tilt head countertop stand mixer and an adequate amount of the mixture was poured onto the prepared greige goods and scraped down the greige goods several times to allow for wet-out. The samples were then placed into the oven having a temperature of 180° F.-200° F. (82.2° C.-93.3° C.). After curing for ten minutes in the oven, the sample was removed and allowed to cool to room temperature. The samples were tested for tuft bind according to ASTM D1335-12. The tuft bind of Example B was 4% greater than Example A and the tuft bind of Example C was 15% greater than Example A.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A carpet, comprising:
   (a) rows of fiber bundles;
   (b) a primary backing, wherein the rows of fiber bundles are tufted into the primary backing, and
   (c) a coating deposited over at least a portion of the primary backing and covering the portion of the fiber bundles tufted into the primary backing, wherein the coating comprises a polyurethane that is a reaction product of:
   (1) a polyisocyanate, and
   (2) an isocyanate-reactive composition comprising:
      (i) 10% to 50% by weight, based on the total weight of isocyanate-reactive components in the isocyanate-reactive composition, of a polyether carbonate polyol having incorporated carbon dioxide content, an OH functionality of 2 to 4, and a number average molar mass of 750 to 6000 grams/mole;
      (ii) 20% to 80% by weight, based on the total weight of isocyanate-reactive components in the isocyanate-reactive composition, of a polyether polyol that is not a polyether carbonate polyol and that has a nominal functionality of at least 3 and an average OH number of 20 to 100; and
      (iii) 5% to 25% by weight, based on the total weight of isocyanate-reactive components in the isocyanate-reactive composition, of a polyether diol that is not a polyether carbonate diol and has a $M_n$ of at least 1000 grams/mole.

2. The carpet of claim 1, wherein the carpet is a synthetic turf and the fibers in the fiber bundles are made of a synthetic material comprising an acrylic polymer, nylon, a polyester, a polyurethane, a polyolefin, or a mixture of two or more thereof.

3. The carpet of claim 1, wherein the polyether carbonate polyol is the addition reaction product of carbon dioxide and an alkylene oxide onto an H-functional starter.

4. The carpet of claim 1, wherein the content of carbonate groups, calculated as $CO_2$ in the polyether carbonate polyol is within the range of 3 to 35% by weight.

5. The carpet of claim 1, wherein the content of carbonate groups, calculated as $CO_2$ in the polyether carbonate polyol is within the range of 10 to 28% by weight.

6. The carpet of claim 3, wherein the polyether carbonate polyol is the addition reaction product of carbon dioxide and alkylene oxide onto a H-functional starter in the presence of a multimetal cyanide catalyst (DMC catalyst).

7. The carpet of claim 1, wherein the polyether carbonate polyol is present in an amount of 4 to 20% by weight, based on the total weight of the isocyanate-reactive composition.

8. The carpet of claim 1, wherein the isocyanate-reactive composition further comprises chain extender have a molecular weight of 60 to 490 g/mol and two isocyanate-reactive groups per molecule.

9. The carpet of claim 8, wherein the chain extender is present in an amount of 5% to 25%, based on the total weight of isocyanate-reactive components in the isocyanate-reactive composition.

10. The carpet of claim 9, wherein the isocyanate-reactive composition further comprises a filler comprising a silicate, $TiO_2$, glass fiber, carbon black, graphite, calcium carbonate, talc, mica, and/or a clay, wherein the filler is present in the isocyanate-reactive composition in an amount of 20 to 80% by weight, based on the total weight of the isocyanate-reactive composition.

11. The carpet of claim 2, further comprising an infill comprising rubber particles.

12. A synthetic grass surface comprising synthetic grass blades having an end extending away from a backing, wherein the backing has deposited on at least one side thereof a coating comprising a polyurethane that is a reaction product of:

(1) a polyisocyanate, and
(2) an isocyanate-reactive composition comprising:
  (i) 10% to 50% by weight, based on the total weight of isocyanate-reactive components in the isocyanate-reactive composition, of a polyether carbonate polyol having incorporated carbon dioxide content, an OH functionality of 2 to 4, and a number average molar mass of 750 to 6000 grams/mole;
  (ii) 20% to 80% by weight, based on the total weight of isocyanate-reactive components in the isocyanate-reactive composition, of a polyether polyol that is not a polyether carbonate polyol and that has a nominal functionality of at least 3 and an average OH number of 20 to 100; and
  (iii) 5% to 25% by weight, based on the total weight of isocyanate-reactive components in the isocyanate-reactive composition, of a polyether diol that is not a polyether carbonate diol and has a $M_r$, of at least 1000 grams/mole.

13. The synthetic grass surface of claim 12, wherein the content of carbonate groups, calculated as $CO_2$ in the polyether carbonate polyol is within the range of 3 to 35% by weight.

14. The synthetic grass surface of claim 12, wherein the isocyanate-reactive composition further comprises:
  (iv) a chain extender having a molecular weight of 60 to 490 g/mol and two isocyanate-reactive groups per molecule that is present in an amount of 5% to 25%, based on the total weight of isocyanate-reactive components in the isocyanate-reactive composition; and
  (v) a filler comprising a silicate, $TiO_2$, glass fiber, carbon black, graphite, calcium carbonate, talc, mica, and/or a clay, wherein the filler is present in the isocyanate-reactive composition in an amount of 20 to 80% by weight, based on the total weight of the isocyanate-reactive composition.

15. The synthetic grass surface of claim 12, further comprising an infill comprising rubber particles.

* * * * *